(12) United States Patent
Lempel et al.

(10) Patent No.: US 9,111,291 B2
(45) Date of Patent: Aug. 18, 2015

(54) SYSTEM AND METHOD FOR PROVIDING SPONSORED APPLICATIONS IN EMAIL

(75) Inventors: Ronny Lempel, Zichron (IL); Yoelle Maarek Smadja, Haifa (IL); Edward Bortnikov, Haifa (IL); Edo Liberty, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/526,693

(22) Filed: Jun. 19, 2012

(65) Prior Publication Data

US 2013/0339137 A1    Dec. 19, 2013

(51) Int. Cl.
*G06Q 30/02* (2012.01)

(52) U.S. Cl.
CPC ............ *G06Q 30/02* (2013.01); *G06Q 30/0241* (2013.01); *G06Q 30/0251* (2013.01); *G06Q 30/0276* (2013.01)

(58) Field of Classification Search
CPC .......... G06Q 30/0271; G06Q 30/0241; G06Q 30/0251; G06Q 30/0276
USPC ....................................................... 705/14.4
See application file for complete search history.

(56) References Cited

U.S. PATENT DOCUMENTS

| | | | |
|---|---|---|---|
| 6,618,725 B1* | 9/2003 | Fukuda et al. | 1/1 |
| 2007/0124194 A1* | 5/2007 | Barnette et al. | 705/10 |
| 2008/0235083 A2* | 9/2008 | Bosarge et al. | 705/14 |
| 2009/0100078 A1* | 4/2009 | Lai et al. | 707/100 |
| 2009/0125377 A1* | 5/2009 | Somji et al. | 705/10 |
| 2009/0276316 A1* | 11/2009 | Verma et al. | 705/14.54 |
| 2012/0016735 A1* | 1/2012 | Park et al. | 705/14.42 |
| 2012/0150662 A1* | 6/2012 | Hannon et al. | 705/14.73 |
| 2013/0041902 A1* | 2/2013 | Swann et al. | 707/737 |

* cited by examiner

*Primary Examiner* — Jami A Plucinski
*Assistant Examiner* — Sam Refai
(74) *Attorney, Agent, or Firm* — James J. DeCarlo; Greenberg Traurig, LLP

(57) ABSTRACT

A method and system for providing targeted applications within an electronic message interface. The method comprises retrieving content from a user's electronic message in the electronic message interface, parsing and interpreting the user's context from the content, and accepting bidding on the user's interpreted context from one or more applications, the one or more applications including triggering conditions related to the user's interpreted context. The one or more applications are ranked based on the bidding. The method further comprises loading the one or more applications into the electronic message interface based on the ranking, and providing one or more follow-up transactions associated with the one or more loaded applications based on the user's interpreted context.

14 Claims, 6 Drawing Sheets

SYSTEM AND METHOD FOR PROVIDING SPONSORED APPLICATIONS IN EMAIL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

The present application is related to U.S. patent application Ser. No. 12/981,860, entitled "SYSTEM AND METHOD FOR PROVIDING CONTEXTUAL ACTIONS ON A SEARCH RESULTS PAGE," filed on Dec. 30, 2010, which is hereby incorporated by reference herein in their entirety.

FIELD OF THE INVENTION

This application generally relates to providing targeted, contextual applications in an electronic message environment. More specifically, the application is directed towards systems and methods for parsing electronic message context, determining relevant transactions with companies, and presenting one or more applications in the electronic message environment.

BACKGROUND OF THE INVENTION

A large portion of email messages received today by users are in the form of automatically generated commercial messages, such as those sent by companies, organizations and service providers to individuals. Although some of these automated messages may include spam and random advertisements and offerings, other messages result from a user's direct interaction or affiliation with a company. For example, these messages may include the result of transactions that a user has performed with companies, such as, travel itinerary confirmation, reservation reminders, eCommerce receipts, etc. With such increases in messages related to a user's purchases and interests, additional opportunities for product and service solicitation can be created.

In the current state of the art, some email services may display advertisements in conjunction with a user's email interface similar to how advertisements are displayed next to search results provided by a search engine. GMAIL provided by GOOGLE inc., is an exemplary email service that displays advertisements in the email interface. However, these advertisements merely provide simple text-only ads with static hyperlinks that direct users to an advertiser's home webpage when selected.

Current email services lack customized advertising for facilitating follow-up transactions based on a user's current context. Thus, there exists a need to provide contextual applications for making actions available to potential clients in anticipation of a user's goal when they are in a mood or state of mind to pursue these services based on their email contexts.

SUMMARY OF THE INVENTION

The present application provides methods and systems for providing targeted, transactional applications within an electronic message interface. The method according to one embodiment comprises retrieving content from a user's electronic message in the electronic message interface, parsing and interpreting the user's context from the content, and accepting bidding on the user's interpreted context from one or more applications, wherein the one or more applications include triggering conditions related to the user's interpreted context. The one or more applications are ranked based on the bidding. The method further comprises loading the one or more applications into the electronic message interface based on the ranking, and providing one or more follow-up transactions associated with the one or more loaded applications based on the user's interpreted context.

According to one embodiment, the retrieved content may be classified into at least one of a plurality of target audience segments, and the one or more applications may be retrieved based on the at least one target audience segment of the retrieved content. The one or more follow-up transactions may include at least one of purchases, reservations, registrations, trades, transfer of funds, and information retrieval. In another embodiment, parsing and interpreting the user's context comprises generating a tokenized form of the retrieved content. The tokenized form of the retrieved content may be associated with the one or more follow-up transactions.

In accordance with some aspects, the method comprises retrieving content from a user's electronic message in the electronic message interface, parsing and interpreting the user's context from the content, and facilitating bidding on the user's interpreted context by one or more applications, the one or more applications including triggering conditions related to the user's interpreted context. The user's response to the one or more applications is predicted. The one or more applications are ranked based on the bidding and the predicted user's response. The method further includes providing the one or more applications in the electronic message interface based on the ranking.

The one or more applications may be instantiated by pre-filling fields based on the content retrieved from the user's context. The retrieved content may be classified into at least one of a plurality of target audience segments, and the one or more applications may be retrieved based on the at least one target audience segment of the retrieved content. According to one embodiment, predicting the user response includes utilizing at least one of a user profile, search history, and electronic message activity. In another embodiment, ranking the one or more applications includes ranking the one or more selected applications based on the one or more applications' popularity. Ranking the one or more selected applications may also include ranking the one or more applications based on revenue. The one or more applications may be developed using an API associated with the electronic message interface.

BRIEF DESCRIPTION OF THE DRAWINGS

The invention(s) is/are illustrated in the figures of the accompanying drawings which are meant to be exemplary and not limiting, in which like references are intended to refer to like or corresponding parts, and in which.

DETAILED DESCRIPTION OF THE INVENTION

Figure 1:
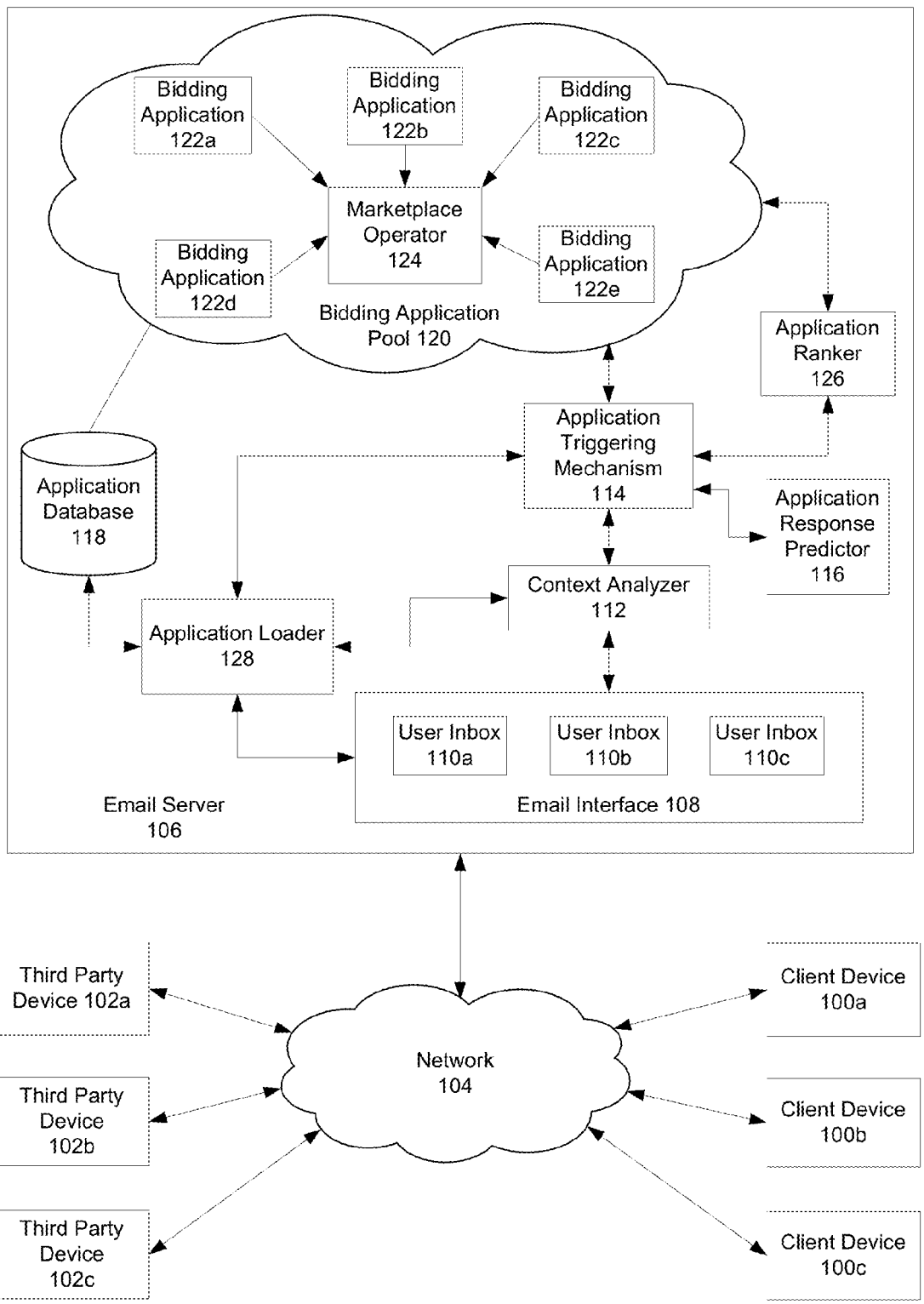
FIG. 1 illustrates a block diagram depicting a computing system for providing contextual transaction applications in an electronic message environment according to one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

According to the present application, third party companies may be presented with opportunities to conveniently offer follow-up products or services to users based on the users' previous activities with other companies, entities, or individuals. More specifically, given an email message, for example, representing a transaction between a user and a company, other third party companies may take advantage of the identification of the transaction and display follow-up or peripheral transactions to the user along with the given email message. The display of transactions may include providing interactive applications that allow users to conduct purchases, reservations, registrations, trades, transfer of funds, information retrieval, etc. An email provider may receive bids from the third party companies to offer follow-up transactions in the context of the given email message. Proposing such follow-up transactions to a user in the right context (e.g., while the user is reading an email of a transaction related to a follow-up transaction), may drive business to the follow-up transaction company as well as allow the user to conveniently conduct additional transactions that are targeted to the user's current or real-time context within an email interface. In addition to the benefits to users and third party companies, the email provider may reap the benefit of monetizing the email service as it will charge companies whose transaction offers are shown to or used by users. The display of follow-up transactions is not limited to email interfaces but can include various kinds of online messaging services, such as blogs, forums, community Q&A, microblogging and social networking sites, media sharing sites, instant messaging, online games, or any other online service where users are able to receive and send text-based communications.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds. Subgroups may exist or be created according to user profiles of individuals, for example, in which a subgroup member may belong to multiple subgroups. An individual may also have multiple "1: few" associations within a social network, such as for family, college classmates, or co-workers.

FIG. 1 presents a block diagram depicting a computing system for providing contextual transaction applications in an electronic message environment according to one embodiment of the systems disclosed herein. As the embodiment of FIG. 1 illustrates, a plurality of client devices 100a, 100b, 100c are connected to an email server 106 through network 104. Additionally, third party devices 102a, 102b, and 102c are connected to email server 106 through network 104. The email server 106 comprises a plurality of components including an email interface 108, context analyzer 112, application triggering mechanism 114, application response predictor 116, application database 118, application ranker 126, and application loader 128. Client devices 100a, 100b, and 100c and third party devices 102a, 102b, and 102c may be general purpose computing devices (e.g., personal computers, television set top boxes, mobile devices, terminals, laptops, personal digital assistants (PDA), cell phones, tablet computers, e-book readers, or any computing device having a central processing unit and memory unit capable of connecting to a network).

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

Client devices 100a, 100b, and 100c and third party devices 102a, 102b, and 102c are operative to communicate with email server 106 via network 104. Network 104 may be any suitable type of network allowing transport of data communications across thereof. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. In one embodiment, the network may be the Internet, following known Internet protocols for data communication, or any other communication network, e.g., any LAN, or WAN connection.

Client devices 100a, 100b, and 100c may transmit requests to email server 106 via the HTTP, WAP or similar protocol for the client/server exchange of text, images and other data. The client devices 100a, 100b, and 100c are operative to transmit various requests to access user inboxes 110a, 110b, and 110c through email interface 108. User inboxes 110a, 110b, and 110c are not necessarily limited to user "inboxes" and may represent an instance of a user's email session, a virtualized/cloud environment, or an email client within email interface 108. Email interface 108 may be a web-based email service hosted on email server 106, such as YAHOO! MAIL, and accessible by client devices 100a, 100b, and 100c. In another embodiment, client devices 100a, 100b, and 100c may use a desktop email client, such as MICROSOFT OUTLOOK, for accessing email service at an email server 106 via email interface 108.

Users of client devices 100a, 100b, and 100c may be provided with email services and features offered by email server 106 through email interface 108 including services, such as receiving and composing messages, message storage, contact list management, calendaring, and any other typical email service feature. Email server 106 receives requests from the client devices via email interface 108. In one embodiment, email interface 108 may comprise various hardware components running Simple Mail Transfer Protocol (SMTP), Post Office Protocol (POP), Internet Message Access Protocol (IMAP) mail server software, or any other suitable email server software. Email server 106 may also provide portal services in addition to or complimentary to the email services, such as, a search engine feature, news, stock quotes, weather, etc.

Although FIG. 1 illustrates email server 106 as a single entity, email server 106 may be comprised of one or more servers. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In the illustrated embodiment, email interface 108 provides an interface environment to the services provided by email server 106. According to the illustrated embodiment, email interface 108 comprises an email client interface allowing client device 102a, 102b, and 102c to send/receive, store, and review email messages. Email interface 108 communicates with context analyzer 112. In the illustrated embodiment, email interface 108 transmits email content from the users' contexts of user inboxes 110a, 110b, and 110c to context analyzer 112. Email content may include messages associated with the users' electronic mailboxes providing users' context. A context may include a snapshot or real-time activity of a user interacting with or using email service within a respective user inbox 110a, 110b, or 110c.

Upon receiving a given email content from the context of a given user, the context analyzer 112 may analyze the email content and provide an interpretation of the content that represents the given user's context with respect to the content. For example, context analyzer 112 may receive a confirmation email from the user's inbox including text "flight New York City to San Francisco." Context analyzer 112 is operative to translate the text into a structured format such as "<token:flight><city:new york city><token:to ><city:san francisco>." As illustrated, the context analyzer 112 converts the plain text into a tokenized version based on properties of the received message. In the previous example, the context analyzer 112 extracts the terms "flight" and "to" as tokens and "New York City" and "San Francisco" as cities. In alternative embodiments, the context analyzer may utilize a plurality of external metrics in generating an interpretation. For example, context analyzer 112 may utilize a user profile (including long and short-term activity), matching concepts and entities or objects, and the original user text.

Context analyzer 112 parses the content of the user's context and transmits the interpreted context to application triggering mechanism 114. In the illustrated embodiment, the application triggering mechanism 114 may index applications, store metadata for retrieving and select targeted applications based on user email context. Based at least in part on the identified content and context, the application triggering mechanism 114 may select one or more applications for display with the given user's email context. Third party devices 102a, 102b, and 102c may submit the applications for providing follow-up transactions from users when predetermined conditions specified by the third party associated with the applications are satisfied by the context of email users of email server 106. In the illustrated embodiment, application triggering mechanism 114 stores metadata for aiding in the fast retrieval and ranking of the applications. In addition to providing fast retrieval, application triggering mechanism 114 may additionally manage additions of applications to the application database 118. Application triggering mechanism 114 may receive new applications and data from developers and index the applications stored in the application database 118.

The one or more applications may include contextual transaction applications comprising script or flash-based software, instructions, or code that can be embedded within a web page, client, or interface, and executable by a user of the email service to perform actions related to the user's email context with third party companies directly from user inboxes 110. The actions may include transactions, purchases, reservations, registrations, trades, transfer of funds, information retrieval, etc. Applications may additionally include data mining operations for collecting information from users' contexts. According to an alternative embodiment, the contextual transaction applications may interface with and allow users to perform actions with other services also offered by the provider of the email service (e.g. non-third party applications). For example, a user of YAHOO! MAIL may receive an email confirmation of a plane ticket purchase from New York to San Francisco, and based on an analysis of the email confirmation, a YAHOO! TRAVEL application may be provided to the user to find prices and to book hotels or rental cars in San Francisco, and a YAHOO! SHOPPING application may be provided to the user to shop for luggage bags and other travel-related goods in New York.

The applications received by email server 106 and stored in application database 118 may be developed by third party companies using an Application Programming interface (API). The API may be provided by the email service provider for developing applications for use with and compatible with email interface 108. The API may include a source code-based specification to be used as an interface by application components developed by third party companies to communicate with email interface 108. The API may also include specifications for routines, data structures, object classes, and variables for use by developers to create applications for email interface 108. Applications developed using the API may be embedded in email reading/authoring panes e.g., in inboxes 110.

The API may also provide a bidding language that can be used by the third party companies in their applications to specify when their applications should be triggered for display in user inboxes 110. Bidding language specified by the API may include using email-orientated language to express meaningful email contexts. The contextual transaction applications may be associated with bids describing triggering conditions of when (in the context of which emails) these contextual transaction applications should be triggered and shown to the user. Applications received by email server 106 from third party devices 102 may be stored on application database 118 and indexed in application triggering mechanism 114. According to one embodiment, applications submitted by third party devices 102 may be prescreened for issues regarding viruses, content, privacy policy, etc. An index in application triggering mechanism 114 may be maintained for the applications including fields, such as application identification, bid prices, trigger conditions, third party identifier, actions, and any other fields that may be used for bidding and executing the application.

Application triggering mechanism 114 is operable to identify third party contextual transaction applications stored in application database 118 with triggering conditions satisfied by the user's context. The identified applications may be included in bidding application pool 120 for bidding on the triggering user context. Bidding application pool 120 includes marketplace operator 124 to provide or facilitate a virtual marketplace (or a set of virtual marketplaces) for the bidding of email contexts by bidding applications 122. Given a user's email context, bidding may be conducted with marketplace operator 124 between the bidding applications 122 to offer a follow-up action to the user with the given email context. The marketplace operator 124 may, for example, control operate, or manage the auction-based system. Additional details regarding aspects of auction-based systems, and the marketplace operator, can be found in commonly owned U.S. Patent Publication No. 2005/0021461 filed on Jul. 22, 2003, entitled, "TERM-BASED CONCEPT MARKET," and U.S. Patent Publication No. 2005/0187818 filed on Feb. 20, 2004, entitled, "COMPUTERIZED ADVERTISING OFFER EXCHANGE," all of which applications are hereby incorporated herein by reference in their entirety.

Marketplace operator 124 may receive bids from bidding applications 122 based on bid price fields associated with each of the bidding applications (indexed by application triggering mechanism 114), which may include, for example, a minimum and maximum bid price. According to another embodiment, applications may bid and jockey for a user's email context by means of an advertisement campaign management module. An advertisement campaign management module includes one or more tools for facilitating planning, management, optimization, delivery, communication, and implementation of the applications submitted by third party devices 102. Additional details regarding aspects of campaign management can be found in commonly owned U.S. Patent Publication No. 2007/0027754 filed on Dec. 30, 2005, entitled, "SYSTEM AND METHOD FOR ADVERTISEMENT MANAGEMENT," which is hereby incorporated herein by reference in their entirety.

Application ranker 126 may determine the rank of the bidding applications 122 based on the bids placed by the bidding applications 122 on the user's context. Based on the outcome of the bidding, application ranker 126 may rank the bidding applications accordingly and forward the rankings to application triggering mechanism 114. Application triggering mechanism 114 may utilize the rankings of the applications from application ranker 126 to determine the display of the applications. Using the rankings, application triggering mechanism 114 may indicate to application loader 128 to load specific applications from application database 118. In another embodiment, the application triggering mechanism 114 may mediate between email contexts and multiple competing applications by considering bids as well as a response prediction (or click through rate) of the bidding applications in the context of the particular email being read/written by the particular user, which may be determined by application response predictor 116. As such, an overall ranking of the bidding applications may be determined based on the bids and response prediction. Applications with the highest overall rankings or applications exceeding an overall ranking threshold may be selected for display in conjunction with an email context of a given user.

Predicting responsiveness, by application response predictor 116, towards bidding applications may include modeling ad clicks and ad conversions in an advertising system, such as one provided by YAHOO! Inc. According to an alternative embodiment, application response predictor 116 may model applications clicks in the email interface. Application response predictor 116 may record user clicks on particular advertisements or applications that have been shown on content pages or email contexts and determine a probability with which a click will happen, with respect to pages, ads/applications, and users. The probability may be estimated by applying machine learning and statistical techniques to a collection of historical click data. Using statistics from this data, the likelihood of certain applications to be clicked on certain pages may be learned. Furthermore, the extent to which certain kinds of term matches between the page and ad (or context and application) will contribute to the click probability may be computed. The application triggering mechanism may use the click probability as a factor when ranking the applications for a given user's email context.

Application triggering mechanism 114 may invoke one or more of the selected bidding applications for display and charge the companies whose applications were selected a sum less than or equal to the respective bids of the triggered applications. The charges may be received by marketplace operator 124 or by a billing and payments module of the email provider (not illustrated) from application triggering mechanism 114. Upon determining which applications to trigger, application triggering mechanism 114 may identify the one or more applications to application loader 128. Applications may be retrieved from application database 118 by application loader 128 and loaded into a corresponding user inbox 110 associated with the bided user context. Based on email context analysis, application bids, and response predictions, a subset of the applications may be selected and displayed in conjunction with a user's email messages (e.g., adjacent to a reading/authoring pane).

Application loader 128 may instantiate and load applications with context parameters from context analyzer 112. In addition to parsing content of the context, context analyzer 112 is operative to extract relevant parameters from an interpreted email context. For example, in the above example, the context analyzer 112 may extract the terms "New York City" and "San Francisco" as relevant parameters. In an alternative embodiment, the context analyzer 112 may additionally convert abbreviations such as "nyc" and "sfo" to "New York City" and "San Francisco" or perform other transformative operations. The parameters extracted by context analyzer 112 may be used to pre-fill application fields. Application fields may include variable input or output associated with a contextual application provided to a given user based on the email context of the user.

One or more fields of the triggered applications can be pre-filled based on the user's current email context. In the previous example, the context analyzer 112 may insert the cities New York City and San Francisco into an application providing airline arrival and departure times. In one embodiment, the context analyzer 112 compares the interpreted context to a plurality of templates. For example, the context analyzer 112 may match the above interpreted context with two templates actions "<Reserve rental car>" and "<Check flight arrival/departure times>." In another example, a flight itinerary email contains the location and dates that are needed to book a hotel stay in the destination city—this information can be used to pre-populate a hotel-reservation application. The email applications described in the present application allows for users to perform non-messaging actions (e.g. reserving a restaurant or booking a hotel) within the email interface using information from the user's email context.

Figure 2:
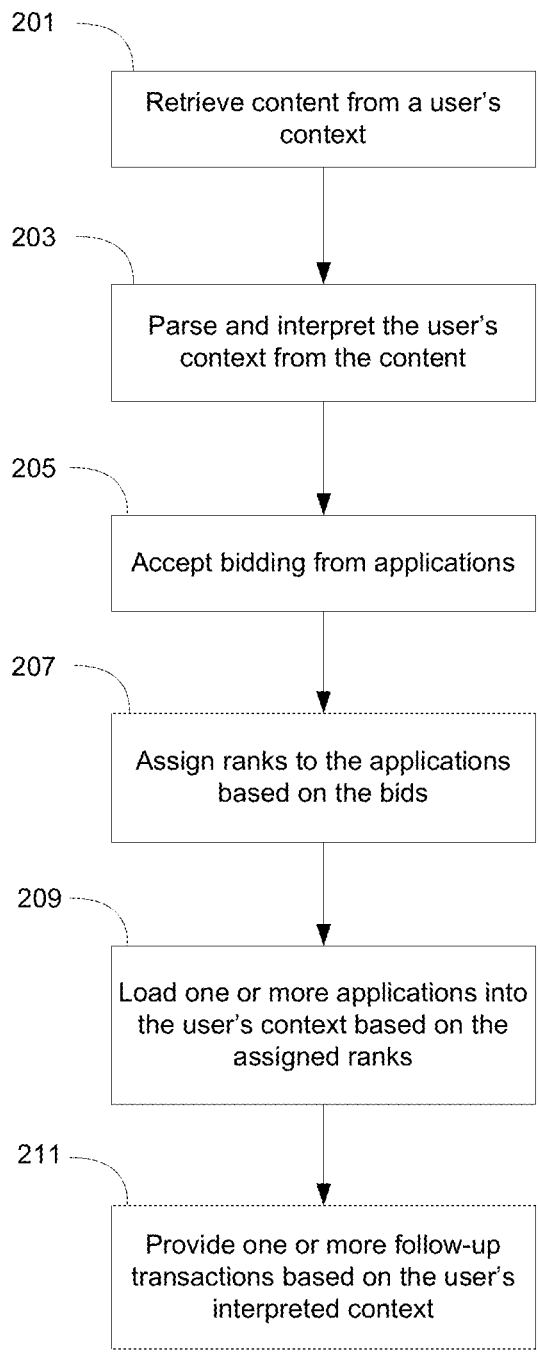
FIG. 2 illustrates a flowchart of a method for providing contextual transaction applications in an electronic message environment according to an embodiment of the present invention.

FIG. 2 presents a flow diagram illustrating a method for providing contextual transaction applications in an electronic message environment according to an embodiment.

In the illustrated embodiment, the method includes the system retrieving content from a user's context, step 201. The system may retrieve and extract content from plaintext string such as "flight nyc to sfo" from email content or from the user's current email context. In another embodiment, the email service providing the electronic message environment may periodically or conditionally mine email messages from users' inboxes, outboxes, etc. After retrieving the content, the system parses and interprets the user's context from the retrieved content, step 203. Parsing the content may include data mining operations performed on the content. The data mining process may discover user patterns and extract knowledge about users from the content. Content may be data mined in real-time of the email context to identify finer-grain target audience segments In one embodiment, target audience segments may be created to classify potential customers by one or more characteristics, in order to identify groups of customers, which have similar needs and demand similar products and/or services. The target audience segments may be separated by geographic segmentations, demographic/socio-economic segmentation, psychographic segmentation (similar attitudes, values, and lifestyles), behavioral segmentation, product-related segmentation, etc. The parsed email messages may be classified into these target audience segments. The target audience segments may be used to identify segment opportunities in email content. For example, rental services, such as one provided by AVIS, may be identified for a segment of travelers flying into major U.S. airports.

In the illustrated embodiment, the system may interpret and convert the plaintext string into a tokenized form. For example, the system may convert the plaintext string "flight nyc to sfo" to the tokenized interpretation "<token:flight><city:new york city><token:to><city:san francisco>." As can be seen, the system translates "nyc" to the token "<city:new york city>" and "sfo" to the token "<city:san francisco>." In one embodiment, the system performs various text-processing operations to reformat the email content in the event that various terms are misspelled, misplaced, etc. The system may recognize words and phrases and associate them with genres, verbs, products, names, locations, etc.

Bidding is accepted from applications, step 205. The applications may be selected from a pool or store of applications stored in an application database. According to an alternative embodiment, sponsored applications may be uploaded into existing advertising marketplaces or exchanges, such as RIGHTMEDIA or DOUBLECLICK, for serving the applications based the email-oriented target audience segments described above. A selected application may be assessed to determine whether a trigger condition of the selected application is satisfied by the user's context. The interpretation of the user's context is compared with one or more trigger conditions of the selected application.

According to one embodiment, applications may include one or more trigger conditions in which the developer of the application wishes to execute/display the application in a message based on the user's context. The developer may desire to display the application for contexts related to a product or service offered by the application. According to one embodiment, accepting bidding from the applications may include entering the application into a bidding marketplace to bid on the user's context. The bids received may be based on predefined bids associated with the application (e.g., price fields), or in another embodiment, applications (or their developers) may place bids using an automated bidding mechanism, such as one provided by an advertisement campaign management system.

Ranks are assigned to the applications based on the bids, step 207. The applications with the highest bids, for example, may be ranked preferentially. According to another embodiment, the applications may also be ranked to optimize revenue for the electronic message provider by strategic application placement in conjunction with users' contexts. In a next step 209, the applications are loaded into the user's context based on the assigned ranks. According to one embodiment, one or more applications with the highest rankings may be selected for loading. The system may load the applications with the electronic message content in varying forms, such as loading the one or more applications alongside the electronic message interface. Applications selected for loading may be loaded according to the context for which they were bid on, or alternatively, in a future user context. In some embodiments, the loaded applications are associated with the user's real-time context. According to yet another embodiment, the electronic message interface may make an advertisement call to the marketplace, identify a target audience segment advertising opportunity associated with the user's context, and receive an application associated with the identified target audience.

One or more follow-up transactions are provided based on the user's interpreted context, step 211. The follow-up transactions are provided via the one or more applications. For example, the system may map a "Reserve rental car" action to an AVIS application that allows the user to reserve a rental car. In another example, the system may also map the "Check flight arrival/departure times" action to an airline schedule application, such as one provided by FLIGHTSTATS, or a similar third party application developer. In the illustrated embodiment, the system may identify a plurality of action templates that match the tokenized interpretation. For example, the system may identify that the tokens "flight" and "to" indicate that a user is traveling between two locations. Based on this interpretation, the system may identify a plurality of action templates, such as a "Reserve rental car" action and a "Find hotels" action. In one embodiment, each identified action is associated with a given weight. For example a "Find hotels" action may be given a higher weight than a "Reserve rental car" action. Determining the weight of actions may be based on historical user metrics (e.g., users book hotel rooms more often than reserve rental cars), revenue metrics (e.g., the amount of revenue generated per application), or a combination thereof.

Figure 3:
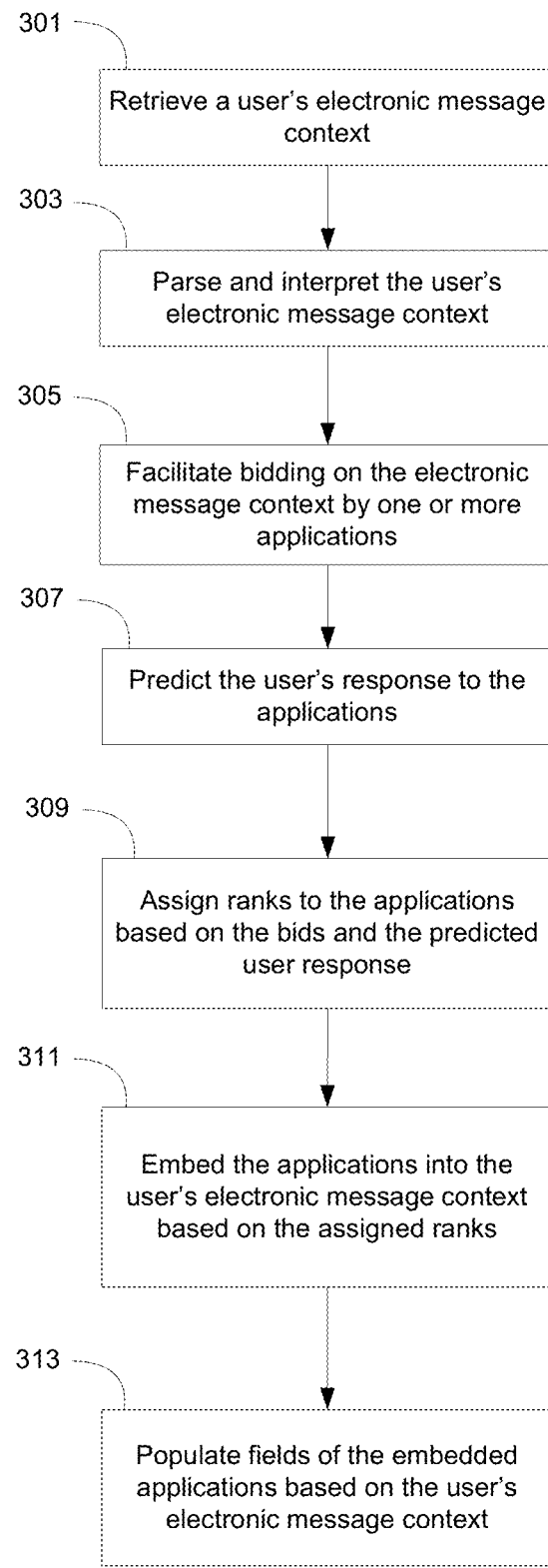
FIG. 3 illustrates a flowchart of a method for providing contextual transaction applications in an electronic message environment according to another embodiment of the present invention.

FIG. 3 presents a flow diagram illustrating a method for providing contextual transaction applications in an electronic message environment according to one embodiment.

As the embodiment of FIG. 3 illustrates, the method performed by the system includes retrieving a user's electronic message context, step 301. In the illustrated embodiment, the system may retrieve the electronic message context via an electronic message interface. For example, the system may extract from the user's electronic message context plaintext string such as "flight nyc to sfo." After receiving the user's electronic message context, the system parses and interprets the user's electronic message context, step 303. In one embodiment, parsing and interpreting the user's electronic message context includes determining whether a user profile or similar structure are associated with the user of the electronic message context. Additionally, determining a user profile exists may entail determining if there are additional, historical electronic message contexts associated with a given user. In another embodiment, contextual data may be stored by an electronic message provider. In yet another embodiment, contextual data may be stored on the client device in the form of a cookie, cache, or similar mechanism.

Bidding on the electronic message context by one or more applications is facilitated, step 305. The applications may include triggering conditions or scenarios when bids should be placed for a given user electronic message context. For example, upon parsing and interpreting a user's electronic message context of a confirmation including a purchase of an air plane ticket, applications for car rentals may determine a match of their trigger condition(s) with the interpreted context and submit bids for the context. The bids may be entered into an auction where the applications jockey for selection or position.

The system may predict the user's response to the applications, step 307. The response prediction may be based on a determination of a transactional appropriateness for the parsed context of the user. For example, by utilizing a user profile, analyzing messages contained in the user's message folders, or extrapolating a user's trends (e.g., email activities), the system may add various aspects of the user's personality to the user's electronic message context, such as that the user is geographically located in New York, often visits the CONTINENTAL AIRLINES' website, prefers AVIS to HERTZ, and views restaurant webpages frequently. These examples of user behavior may be based on a user profile, historical user data, or a combination thereof. Additionally, the system may utilize past search and electronic message activities to tailor applications. For example, the system may identify a user has recently received electronic messages related to traveling to San Francisco or site-seeing in San Francisco and may thus select follow-up actions relating to tourism activities.

Predicting the user's response to the applications may also include using metrics, such as an application's popularity based on the number of users that utilize the application after receiving a particular genre of electronic message. For example, users receiving emails related to flights from a departure city and an arrival city may utilize an AVIS application more frequently than the FLIGHTSTATS application. Various user metric collection devices embedded within the application or application's container page may collect this data. Based on this data, the system may determine that the AVIS application has a high user response rate than the FLIGHTSTATS application.

Ranks are assigned to the applications based on their bids and the predicted user response, step 309. In one embodiment, the system may mediate between multiple competing applications by considering bids as well as an estimation of the response to the bidding applications in the context of the particular electronic message being read/written by the particular user (or a response prediction). The system may return applications having higher relevancy to an individual user based on their context, preferences, and historical electronic messages in addition to the user's current context. In one embodiment, the system may organize relevant applications into a hierarchy of applications. Continuing the above examples, the system may select a plurality of applications relating to reserving rental cars (e.g., an AVIS, HERTZ, and ZIPCAR application).

The system may further indicate that these applications are of the highest priority and the system should place these applications within the highest priority level. However, utilizing the contextual information that a user uses AVIS more often than HERTZ, the system may rank the applications, such that AVIS is the highest priority application within this priority level. The system may determine as many priority levels as necessary. For example, the system may further create a second priority level related to tourism activities, such as a YAHOO WEATHER application, and a YELP restaurant application.

Ranking of applications may utilize various metrics, such as the application's popularity based on the number of users that utilize the application when a user's context includes a particular type of content. This data may be collected by various user metric collection devices embedded within the application or application container page. The system may use other rankings such as ranking by the amount of advertising revenue the applications have earned. Alternatively, or in conjunction with the foregoing, the system may rank applications based on predetermined application quality, authoritativeness, or various other metadata parameters associated with the applications. In another embodiment, the system may utilize past user electronic message activities to identify a given goal. For example, the system may identify that a user has sent and received dinner suggestions as well as movie theatres in a given location. Based on this electronic message pattern, the system may bundle related applications for the electronic message history such as bundling a dining application and a theatre application.

The system may chain applications wherein subsequent applications are "chained" based on user interaction with a first application. For example, the system may determine that a user first interacts with a restaurant application and may subsequently chain additional applications, such as a movie application, based on the first application interactions. In this exemplary embodiment, the system chains applications based on a perceived goal, e.g., a "night out" goal combining a restaurant application and a movie application. In one embodiment, chained applications may be provided asynchronously to a user. For example, an electronic message interface may display a single application (e.g., a restaurant application), and if the user interacts with the application, the system may update the electronic message interface to include a second, chained application (e.g., a movie application). Conversely, if the user does not interact with the restaurant application, the electronic message interface remains unchanged.

Figure 5:
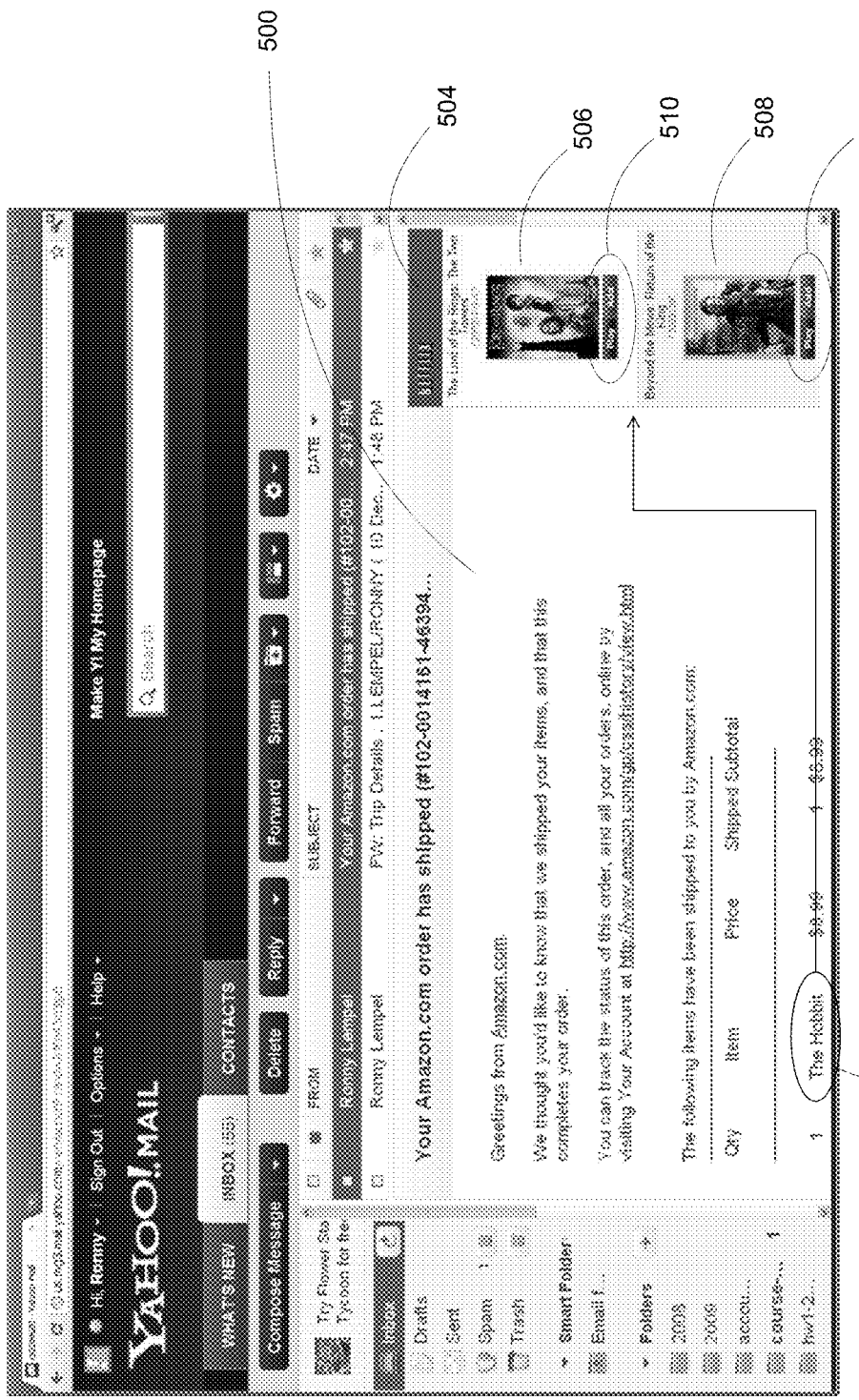
FIG. 5 illustrates a screen diagram illustrating contextual applications in an electronic message environment according to one embodiment of the present invention.
Figure 6:
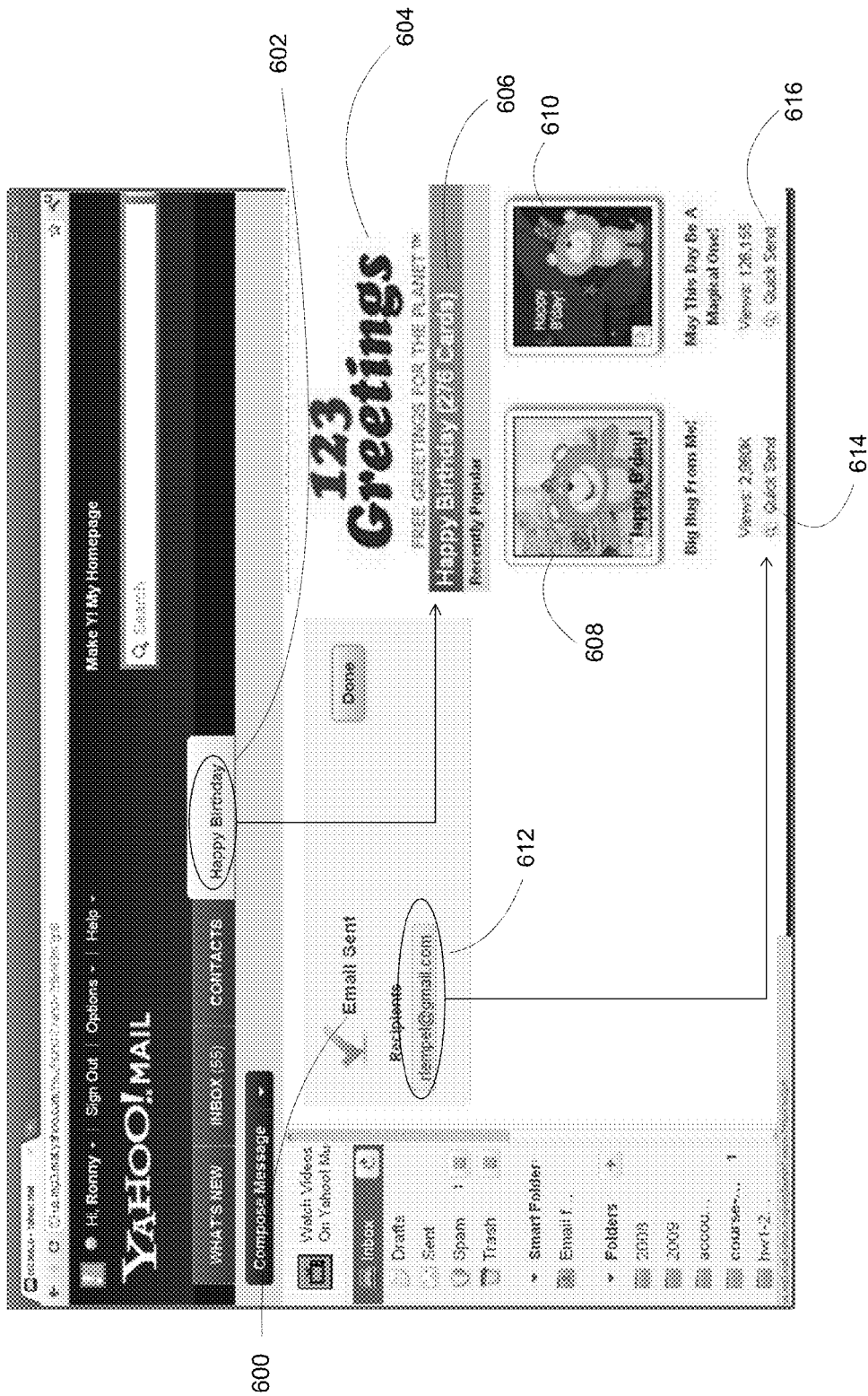
FIG. 6 illustrates a screen diagram illustrating contextual applications in an electronic message environment according to one embodiment of the present invention.

The system may then embed the applications into the user's electronic message context based on the assigned ranks, step 311. In one embodiment, one or more of the highest ranked applications may be selected and triggered. Selected and triggered applications may be loaded into the user's electronic message interface and displayed along with electronic messages. Displaying the applications with electronic message content may be accomplished in varying forms. In one embodiment, the application is displayed alongside the electronic message interface as illustrated in FIG. 4 through 6.

The fields of the embedded applications are populated based on the user's electronic message context, step 313. The system may pre-fill the applications with data tokenized from the user's electronic message. For example, the system may pre-fill the AVIS application with the arrival city indicated in the user's electronic message context (e.g., San Francisco). In another embodiment, the applications may be pre-filled with data associated with a recommendation related to the user's electronic message context such as names of restaurants, museums, and attractions in a city identified as a context of the user's electronic message.

Figure 4:
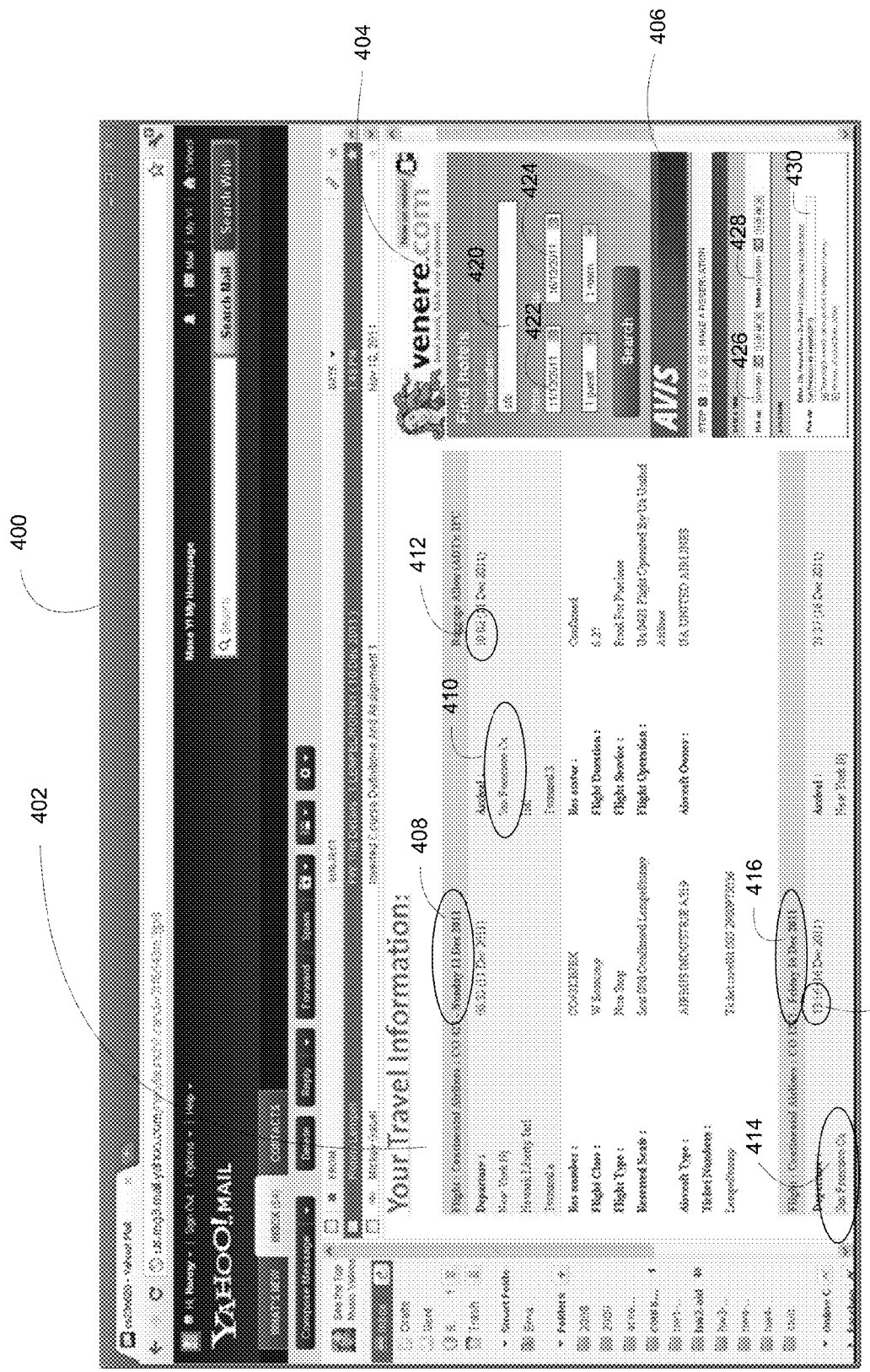
FIG. 4 illustrates a screen diagram illustrating contextual applications in an electronic message environment according to one embodiment of the present invention.

FIG. 4 presents a screen diagram illustrating contextual applications in an electronic message environment according to one embodiment.

As the embodiment of FIG. 4 illustrates, an email message 402 is displayed in email interface 400 including a travel confirmation from New York to San Francisco. In addition to the email message 402, the email interface contains application 404 and application 406 selected for the user's email context. In particular, the email interface displays a VENERE.com application and an AVIS application returned in response to the user's email message of a travel confirmation of a round-trip flight from New York to San Francisco. Application 404 provides an interface to search for hotels with fields pre-filled with data based on email message 402. Application 406 provides an application to make a rental car reservation for date and time based on email message 402.

The application 404 fills in "Destination" field 420, "from" field 422, and "to" field 424. Similarly, the application 406 fills in date and time pick-up field 426, date and time return field 428, and location pick-up field 430. These fields are filled in based on the content from email message 402. Fields 420 and 430 may be filled based on "Arrival" field 410 and "Departure" field 414. Fields 422 and 424 may be determined or filled with data based on flight date 408 and flight date 416. Fields 426 and 428 may be filled with date and time data using fields 408, 412, 416 and 418.

FIG. 5 presents a screen diagram illustrating contextual applications on an electronic message page according to one embodiment of the present. As the embodiment of FIG. 5 illustrates, an email 500 includes an electronic message notifying a recipient of email 500 that an order for "The Hobbit" 502 has shipped. In addition to the email 500, the user is also provided with a NETFLIX application 504 recommending content items 506 and 508. The embodiment of FIG. 5 illustrates an application 504 selected based on the user's email context associated with email 500. In selecting application 504, application 504 may be initiated in bidding for the context of email 500. As a result of the bidding and any other ranking criteria, the service provider may decide that application 504 should be displayed in conjunction with email 500.

The user may conduct an action associated with the recommended content items 506 and 508 using actions 510 and 512, respectively. Application 504 is presented to the user based primarily on the context of email 500. As such, the service provider determines that an email relating to a purchase related to "The Lord of the Rings" genre may be associated with the NETFLIX application offering media content for "The Lord of the Rings" movies. Application 504 may also be presented to a user based on a user profile or similar mechanism.

FIG. 6 presents a screen diagram illustrating contextual applications in an electronic message environment according to one embodiment. According to one embodiment, applications may be displayed to users of the presently described email interface at any time as long as the users' context may be determined. Applications may be displayed while a user is reading messages or performing any other activity in the electronic message interface described herewith. In the illustrated embodiment, applications may also be displayed to users after sending an email. As illustrated, a confirmation of an "email sent" notification 600 is provided to indicate that an email has been sent to recipient 612 regarding a "Happy Birthday" email context 602. Displayed alongside confirmation 600 is an application 604 advertising greeting cards with a theme 606 matching email context 602. Greeting cards 608 and 610 may be displayed to the user as the most popular greeting cards under theme 606 and the user may choose to send these greeting cards to recipient 612 or any additional users via links 614 and 616.

FIGS. 1 through 6 are conceptual illustrations allowing for an explanation of the present. It should be understood that various aspects of the embodiments of the present invention(s) could be implemented in hardware, firmware, software, or combinations thereof. In such embodiments, the various components and/or steps would be implemented in hardware, firmware, and/or software to perform the functions of the present invention(s). That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention(s) as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention(s) to a single embodiment, as other embodiments are possible by way of interchange of some or all of the described or illustrated elements. Moreover, where certain elements of the present invention(s) can be partially or fully implemented using known components, only those portions of such known components that are necessary for an understanding of the present invention(s) are described, and detailed descriptions of other portions of such known components are omitted so as not to obscure the invention(s). In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention(s) encompasses present and future known equivalents to the known components referred to herein by way of illustration.

The foregoing description of the specific embodiments will so fully reveal the general nature of the invention(s) that others can, by applying knowledge within the skill of the relevant art(s) (including the contents of the documents cited and incorporated by reference herein), readily modify and/or adapt for various applications such specific embodiments, without undue experimentation, without departing from the general concept of the present invention(s). Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention(s) have been described above, it should be understood that they have been presented by way of example, and not limitation. It would be apparent to one skilled in the relevant art(s) that various changes in form and detail could be made therein without departing from the spirit and scope of the invention(s). Thus, the present invention(s) should not be limited by any of the above-described exemplary embodiments, but should be defined only in accordance with the following claims and their equivalents.

What is claimed is:

1. A method comprising:
   retrieving, by an e-mail server, content from a user's electronic messages in an electronic message interface;
   parsing and interpreting, by the e-mail server, a user's context from the retrieved content by discovering user patterns and extracting knowledge about users using data mining;
   generating, by the email server, a tokenized form of the retrieved content;
   accepting, by the e-mail server, bidding on the user's interpreted context from one or more applications, wherein each of the one or more applications comprises at least one triggering condition related to the user's interpreted context;
   predicting, by the e-mail server, the user's response to each of the one or more applications;
   ranking, by the e-mail server, the one or more applications based on the bidding and the predicted user response;
   loading, by the e-mail server, at least one of the one or more applications into the electronic message interface based on the ranking;
   identifying, by the email server, a plurality of action templates from the tokenized content wherein each of the plurality of action templates facilitates the respective follow up transaction;
   mapping, by the email server, the action templates to the one or more applications;
   determining, by the email server, weights of the action templates based at least on historical user metrics;
   providing, by the e-mail server, the follow-up transactions associated with the at least one loaded application based on the user's interpreted context and the weights of respective action templates mapped to the one or more applications;
   receiving, by the email server, an interaction of the user with the at least one loaded application;
   identifying, by the email server from the retrieved content, a message pattern;
   identifying, by the email server from the message pattern, a goal associated with the user's context; and
   updating, by the email server, the electronic message interface to comprise a second application of the one or more applications, the second application being chained to the at least one loaded application based on the identified goal.

2. The method of claim 1 further includes:
   classifying the retrieved content into at least one of a plurality of target audience segments; and
   retrieving the one or more applications based on the at least one target audience segment of the retrieved content.

3. The method of claim 1 wherein the one or more follow-up transactions include at least one of purchases, reservations, registrations, trades, transfer of funds, and information retrieval.

4. An apparatus comprising:
   a processor; and
   a storage medium for tangibly storing thereon program logic for execution by the processor, the program logic comprising:
   retrieving logic executed by the processor for retrieving content from a user's electronic messages in an electronic message interface;
   parsing logic executed by the processor for parsing and interpreting a user's context from the content by discovering user patterns and extracting knowledge about users using data mining;
   generating logic executed by the processor for generating a tokenized form of the retrieved content;
   accepting logic executed by the processor for accepting bidding on the user's interpreted context from one or more applications, wherein each of the one or more applications comprises at least one triggering condition related to the user's interpreted context;
   predicting logic executed by the processor for predicting the user's response to each of the one or more applications;
   ranking logic executed by the processor for ranking the one or more applications based on the bidding and the predicted user response;

loading logic executed by the processor for loading at least one of the one or more applications into the electronic message interface based on the ranking;

identifying logic executed by the processor for identifying a plurality of action templates from the tokenized content wherein each of the plurality of action templates facilitates the respective follow up transaction;

mapping logic executed by the processor for mapping the action templates to the one or more applications;

determining logic executed by the processor for determining weights of the action templates based at least on historical user metrics;

providing logic executed by the processor for providing one or more follow-up transactions associated with the loaded applications based on the user's interpreted context and the weights of respective action templates mapped to the one or more applications;

interaction receiving logic executed by the processor for receiving an interaction of the user with the at least one loaded application;

pattern identifying logic, executed by the processor, for identifying from the retrieved content, a message pattern;

goal identifying logic, executed by the processor for identifying, from the message pattern, a goal associated with the user's context; and updating logic executed by the processor for updating the electronic message interface to comprise a second application, the second application being chained to the at least one loaded application based on the identified goal.

5. The apparatus of claim 4 wherein the program logic further comprising:

classifying logic executed by the processor for classification the retrieved content into at least one of a plurality of target audience segments; and further retrieving logic executed by the processor for retrieving the one or more applications based on the at least one target audience segment of the retrieved content.

6. The apparatus of claim 4 wherein the one or more follow-up transactions include at least one of purchases, reservations, registrations, trades, transfer of funds, and information retrieval.

7. The apparatus of claim 4 wherein the program logic further comprising:

prefilling logic executed by the processor for prefilling the one or more applications based on the content retrieved from the user's context.

8. The apparatus of claim 4 wherein the program logic further comprising:

associating logic executed by the processor for associating the one or more applications with the user's interpreted context.

9. The apparatus of claim 4 wherein the one or more applications are developed using an application programming interface associated with the electronic message interface.

10. A non-transitory computer readable storage medium tangibly storing computer program instructions capable of being executed by a computer processor, the computer program instructions comprising code for:

retrieving content from a user's electronic messages in an electronic message interface;

parsing and interpreting a user's context from the content by discovering user patterns and extracting knowledge about users using data mining;

accepting bidding on the user's interpreted context from one or more applications, wherein each of the one or more applications comprises at least one triggering condition related to the user's interpreted context;

predicting the user's response to each of the one or more applications;

ranking the one or more applications based on the bidding and the predicted user response;

loading at least one of the one or more applications into the electronic message interface based on the ranking;

identifying a plurality of action templates from the tokenized content wherein each of the plurality of action templates facilitates the respective follow up transaction;

mapping the action templates to the one or more applications;

determining weights of the action templates based at least on historical user metrics; and providing one or more follow-up transactions associated with the one or more loaded applications based on the user's interpreted context and the weights of respective action templates mapped to the one or more applications;

receiving an interaction of the user with the at least one loaded application;

identifying from the retrieved content, a message pattern;

identifying, from the message pattern, a goal associated with the user's context; and updating the electronic message interface to comprise a second application, the second application being chained to the at least one loaded application based on the identified goal.

11. The non-transitory computer readable storage medium of claim 10, wherein the computer program instructions further defining code for:

classifying the retrieved content into at least one of a plurality of target audience segments; and retrieving the one or more applications based on the at least one target audience segment of the retrieved content.

12. The non-transitory computer readable storage medium of claim 10, wherein the one or more follow-up transactions include at least one of purchases, reservations, registrations, trades, transfer of funds, and information retrieval.

13. The method of claim 1, each of the applications comprising code for the user to perform a respective follow up transaction related to the user's context directly from the electronic message interface.

14. The method of claim 1, the at least one loaded application and the second application are associated with different third-party companies.

* * * * *